H. A. DREW.
COIN COLLECTING, REGISTERING, AND CHANGE DELIVERING APPARATUS.
APPLICATION FILED NOV. 8, 1919.

1,384,436.

Patented July 12, 1921.
5 SHEETS—SHEET 1.

INVENTOR
Harry A. Drew.
BY
Victor J. Evans
ATTORNEY

H. A. DREW.
COIN COLLECTING, REGISTERING, AND CHANGE DELIVERING APPARATUS.
APPLICATION FILED NOV. 8, 1919.

1,384,436. Patented July 12, 1921.
5 SHEETS—SHEET 2.

INVENTOR
Harry A. Drew.
BY
Victor J. Evans
ATTORNEY

H. A. DREW.
COIN COLLECTING, REGISTERING, AND CHANGE DELIVERING APPARATUS.
APPLICATION FILED NOV. 8, 1919.

1,384,436.

Patented July 12, 1921.

INVENTOR
Harry A. Drew
BY Victor J. Evans
ATTORNEY

H. A. DREW.
COIN COLLECTING, REGISTERING, AND CHANGE DELIVERING APPARATUS.
APPLICATION FILED NOV. 8, 1919.

1,384,436.

Patented July 12, 1921.

INVENTOR
Harry A. Drew.
BY
Victor J. Evans
ATTORNEY

UNITED STATES PATENT OFFICE.

HARRY A. DREW, OF WEST NEW YORK, NEW JERSEY, ASSIGNOR, BY MESNE ASSIGNMENTS, TO COIN DEVICE AND SIGNAL CO., INC., OF NEW YORK, N.Y.

COIN-COLLECTING, REGISTERING, AND CHANGE-DELIVERING APPARATUS.

1,384,436.                        Specification of Letters Patent.        Patented July 12, 1921.

Application filed November 8, 1919. Serial No. 336,643.

*To all whom it may concern:*

Be it known that I, HARRY A. DREW, a citizen of the United States, residing at West New York, in the county of Hudson and State of New Jersey, have invented new and useful Improvements in Coin-Collecting, Registering, and Change-Delivering Apparatus, of which the following is a specification.

The object of my present sole invention is the provision of an apparatus of the kind denominated and to a certain extent analogous to the apparatus constituting the subject of the Drew and Mazza Patent 1,227,403 of May 22, 1917, that is simple, practical and durable, is not likely to be deranged by unintelligent efforts to operate or by rough treatment, and is not open to fraudulent operation by dexterous repetitions of signals or otherwise.

To the attainment of the foregoing, the invention consists in the improvement as hereinafter described and definitely claimed.

In the accompanying drawings, hereby made a part hereof:

Fig. 2 is a vertical section of the same.

Fig. 7 is a fragmentary elevation of a modification of that portion of the mechanism that has to do with the completion of circuits through the medium of deposited coins.

Fig. 8 is a fragmentary elevation of a modification hereinafter explicitly referred to.

Fig. 9 is a perspective of the office or central station control and registering unit.

Similar numerals of reference designate corresponding parts in all of the views of the drawings.

For the sake of brevity and clearness, reference will first be had to Figs. 1 to 4, wherein are illustrated highly important features of my invention. The portion of my apparatus comprised in said figures is designed, for example, to be located in a hotel room, and among other elements it comprises a back wall 1 which, in conjunction with a wall 2, forms a casing the closure section of which is numbered 3. The said closure section 3 is detachably secured at 4 in hooked manner to the wall 1, and is designed to be locked at 5 to the wall 2, so that an authorized person may expeditiously and easily unlock and entirely remove the closure section 3 so as to gain access to the mechanism within the casing for repair or replacement purposes.

Figures 2, 7, 8, 9:
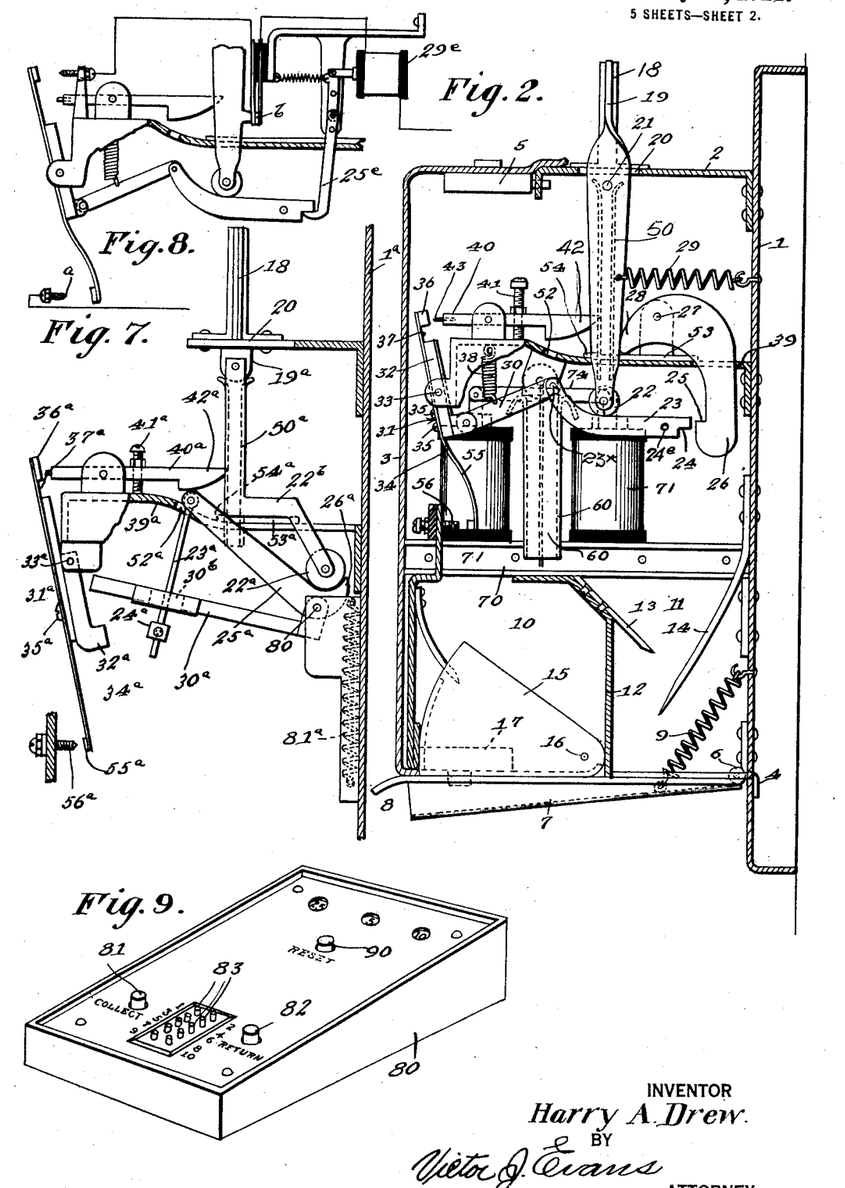

Hinged at 6 to the back wall 1 is a coin-delivery tray 7 having projecting thumb portions 8; said tray being normally retained in and returned to the position shown in Fig. 2 through the medium of retractile springs 9.

In the lower portion of the casing described is a compartment 10 and a vertical passage 11, the two being separated by a transverse partition wall 12. In the passage 11 are two coöperating combined chutes and guards 13 and 14; the same being preferably in the form of imperforate plates with sharpened lower edges, and being designed to effectively prevent the upward introduction of the hand or an instrument for the surreptitious working of the mechanism, without interfering in any measure with the gravitation of a coin to be returned to the tray 7. In the compartment 10 is a money-receptacle 15, pivoted at 16 to the casing and having an individual lock 17 by which it is secured in closed position independently of the closure section 3 before referred to.

Extending upwardly from the top of the casing portion 2, are upright-receiving conduits 18, three in number and arranged in edgewise alinement and in a series transverse of the casing. Also extending upwardly from the casing wall 2, is a hand lever 19, adapted to play in a slot 20 in the top wall of the casing section. The said lever 19 is fulcrumed at 21 and provided at its lower end with an anti-friction wheel 22, and said wheel 22 is opposed to a vertically swinging lever 23, rabbeted at 24, and adapted to coöperate with a projection 25 on the comparatively long and heavy arm 26 of a gravitational latch that is fulcrumed at 27 and has its upper and comparatively short arm 28 opposed to the edge of the lever 19. A retractile spring 29 is interposed between and connected to the back wall 1 and the lower arm of the lever 19 to return the said lever 19 to and yieldingly maintain the same in the position shown in Fig. 2. The forward end of the lever 23 is pivotally connected at 23ˣ to a link 30 and is connected through said link 30 with a swinging conductive element 31, so denominated because it obviates the necessity of employing loose wires or other electrical connections, and which is an important feature of my invention for such reason. The lever 23 is pivotally supported at 24ᵉ, Fig. 2. The said conductive element 31 is made up of a body 32, preferably of fiber, fulcrumed at 33, and metallic strips 34, three in number, fixedly connected by screws 35 to the face of the body 32, and free from said face above the screws 35 so as to have the capacity of springing away from the body above the point of connection thereto. At about the distance illustrated above the body 32, the strips 34 are provided with fiber or other insulating blocks 36, and between the said fiber blocks 36 and the upper edge of the body 32, the said strips 34 are provided with contact-making portions 37. A retractile spring 38 is interposed between the link 30 and the fixed partition 39 in the casing, in order to return the said link 30 and the parts connected therewith to and yieldingly maintain the same in the position shown in Fig. 2. At 40 are coin-operable circuit-completing levers, three in number, and arranged in front of the transverse vertical plane in which the conduits 18 are disposed. Each lever 40 is provided on its rear arm with an adjustable stop 41 to bring up against the fixed partition 39. Each lever 40 also has a tapered head 42 on its rear arm, and at its forward end each lever 40 has a contact-making pin 43 to coöperate with the portion 37 of its respective spring strip 34. Fixed with respect to the lower arm of the lever 19 and arranged in a series transversely of the casing, are coin chutes 50, three in number, which normally rest in vertical alinement with the conduits 18, Fig. 2, and have openings 51 in their front and rear walls to receive the head 42 of their complementary levers 40. At 52 is a slot in the fixed partition 39 for the downward passage of coins, and at 53 is a hard steel plate fixed upon the partition 39 and having a forward edge 54 that is relatively arranged to the chutes 50, the lever head 42 and the vertically disposed opening 52, as shown, for a highly important purpose hereinafter set forth. Each of the spring strips 34 is provided adjacent to its lower end with a contact piece 55 to engage a complementary terminal 56 in an electrical circuit, hereinafter referred to.

Figures 1, 4, 5, 6:
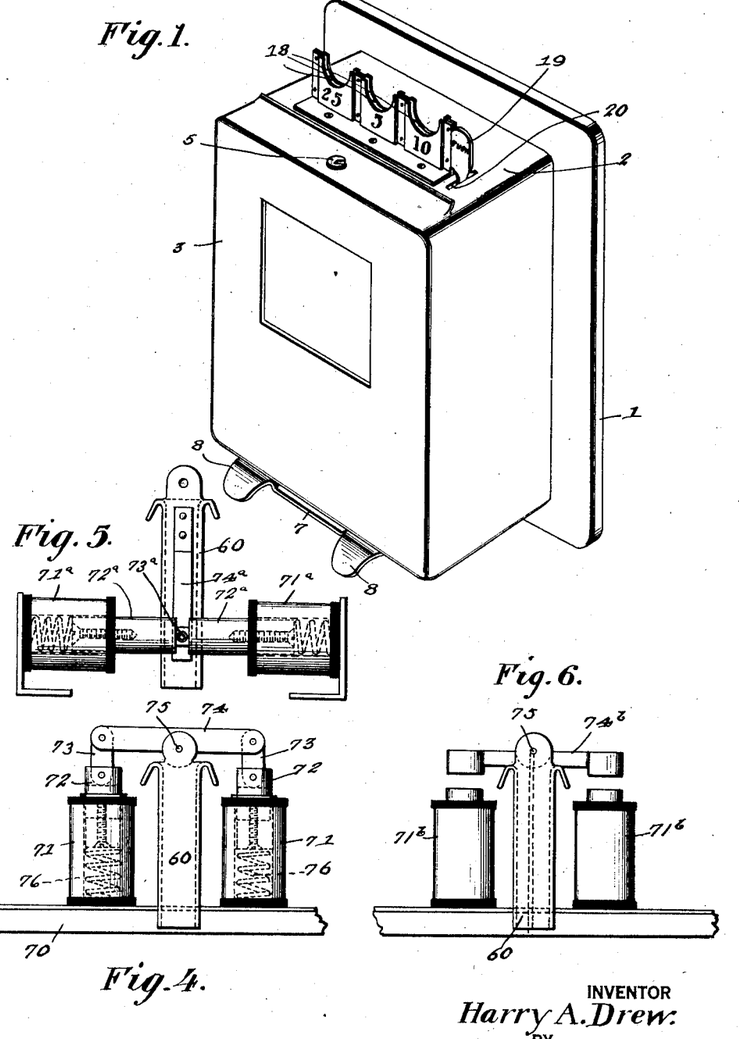
Figure 1 is a perspective illustrative of a room unit.
Fig. 4 is a detail elevation illustrative of the electro-mechanical means for controlling the coin-receiving switch.
Figs. 5 and 6 are similar views of modifications of said mechanism.

At 60 is what may be properly denominated a coin-receiving switch, through the medium of which a person in authority and located at a remote point from the room apparatus, say in a hotel office, is enabled to bring about the discharge of the coin either into the compartment 10 for retention in the casing, Figs. 1 and 2, or to the passage 9 for the gravitation thereof into the tray 7, as when it is necessary to return the coin to the party operating the apparatus, Figs. 1 and 2. Now that portion of my improvement thus far specifically described has to do with the establishing of complete circuits by the deposit of coins in the conduit 18 and through the medium of the lever 19 in coöperation with the said coins; it being understood, however, that only one coin is deposited at a time. Therefore, when say a ten-cent piece is deposited in the 10¢ conduit 18, Fig. 1, the said 10¢ piece drops in the chute 50 and brings up against the plate 53. Then when rearward pressure is exerted against the upper arm of the lever 19, the lower arm of said lever will be swung forwardly, whereupon the anti-friction wheel 22 will rock the lever 23 so that the projection 25 of the gravitational latch will assume a position in the rabbet 24 of the lever 23, and secure the said lever 23 for the time being in the position to which it is moved. Manifestly downward movement of the forward arm of the lever 23 will be attended by thrusting of the link or pitman 30 forwardly, so that the contact pieces 55 will be carried into engagement with their complementary terminals 56, and at the same time the insulating blocks 36 will be carried against the contact points 43. At this time the upper portions of all of the spring strips 34 will be sprung forwardly to a slight extent from the face of the body 32. Continued forward movement of the lower arm of the lever 19, together with the 10¢ piece in the 10¢ chute, will first be attended by dropping of the 10¢ piece into position in front of the stop 54, for an important purpose presently made clear, and further forward movement of the lower arm of said lever 19 and the chute 50 will be attended by the upper edge of the deposited coin acting against the lower edge of the head 42 on the 10¢ lever 40; with the result that the contact pin 43 of said lever will be moved downwardly and out of engagement with its complementary insulating block 36, whereupon the 10¢ spring strip 34 will spring forwardly and carry its portion 37 into engagement with the pin 43, and in consequence the person in authority at the distant station will be apprised of the deposit of a 10¢ piece in the apparatus, Figs. 1 and 2. This operation will also be true when a coin of proper denomination is deposited in either of the other two conduits 18, and it will be noticed here that when a contact is once made between one contact pin 43 and its complementary spring strip portion 37, the said contact cannot be broken and reëstablished while the coin previously deposited is in engagement with the lever 40. This is due to the fact that the coin is in the chute 50 carried by the lower arm of the lever 19, and the coin before it moves the lever 40, is in front of the stop 54, and consequently the coin in coöperation with the stop 54 prevents rearward movement of the lower arm of the lever 19. From this it follows that when a coin is deposited in one of the conduits 18, and the lever 19 is manipulated, the circuit corresponding to that coin cannot be completed at the point 37 more than once—i. e., the circuit cannot be established and broken and reëstablished at that point incidental to the deposit of a single coin in the apparatus, Figs. 1 and 2. This will be appreciated as an important advantage when it is stated that experience has demonstrated that heretofore unscrupulous persons have, by manipulating the lever of a room apparatus, been able to signal to the distant station the deposit of more than one coin of a particular denomination, notwithstanding only one of such coins was really deposited. Following sufficient forward movement of the lower arm of the lever 19, the coin deposited gravitates through the opening 52 in the fixed partition 39, whereupon the spring 29 will operate to draw said lower arm rearwardly. Said lower arm then engages the arm 28 of the gravitational latch and swings said latch out of engagement with the lever 23, whereupon the spring 38 resumes its normal state and in so doing through the link 30 returns the swinging conductive element 31 to the position shown in Fig. 2.

Superimposed upon a support 70 in the casing are two solenoids 71, the armatures 72 of which are connected through links 73 with the opposite ends of a lever 74 that is fulcrumed at 75, and is fixed with respect to one end of the coin-receiving switch 60. Disposed in the solenoids 71 and under the armatures 72 are cushioning springs 76 which, as their name imports, are designed to cushion the downward movements of the armatures 72 with a view to averting shock and jar while lending steadiness of motion to the operation of the armatures, the lever 74 and the coin-receiving switch 60. The operation of this part of my improvement will be understood when it is stated that energization of the coil of one solenoid will be attended by swinging movement of the switch 60 to a position to discharge the coin into the compartment 10, and energization of the coil of the other solenoid 71 will bring about swinging of the switch 60 to a position to discharge the coins into the proper passage. Manifestly such energization of the solenoids may be accomplished by the completion of circuits including the coils of the solenoids at a point distant from the apparatus shown in Figs. 1 and 2.

In Fig. 5 of the drawings, I illustrate a modified electro-mechanical arrangement whereby a person at a distant point from the room apparatus may move the coin-receiving switch 60. In the said modification, Fig. 5, the solenoids 71ª are arranged in alinement, and their armatures 72ª are connected at 73ª with a bar 74ª, fixed with respect to the switch 60.

In Fig. 6 I illustrate another electro-mechanical means for the manipulation of the switch 60. In this modification, the lever 74ᵇ, fulcrumed at 75 and fixed with respect to the switch 60, is adapted to serve as an armature, and in combination with electro-magnets 71ᵇ, the said magnets being adapted to be energized and deënergized by a person distant from the room apparatus.

In Fig. 7 I illustrate a modification of the mechanism whereby the deposit of a coin followed by manipulation of the hand lever will bring about the completion of the signal circuit complementary to said coin. In the said modification the anti-friction wheel 22ª is carried by an offset portion 22ᵇ on the lower arm of the lever 19ª, and the circuit-making and breaking levers 40ª, only one of which is shown, are mounted on the fixed partition 39ª, and are equipped with adjustable stops 41ª and with rear heads 42ª. On the fixed partition 39ª is a hard steel plate 53ª having a stop portion or portions 54ª arranged in proper relation to the lever head 42ª and the coin-opening 52ª in partition 39ª. Fulcrumed at 80 in the casing is a vertically swinging lever 25ª on which is a short arm 26ª, shaped as shown, for coöperation with the anti-friction wheel 22ª. A retractile spring 81ª is interposed between and connected to the casing wall 1ª and the said arm 26ª. Also fulcrumed at the point 80 is a vertically swinging element 30ª, and pivoted to the long arm of the lever 25ª and extending loosely through an opening 30ᵇ in the element 30ª, is a rod 23ª, having an enlargement 24ª on its lower portion. Pivoted at 33ª to a pendent portion of the fixed partition 39ª, is a swinging conductive element 31ª that includes a body 32ª, preferably of fiber, and spring strips 34ª, three in number, having contact pieces 55ª for coöperation with terminals 56ª, and also having insulating blocks 36ª and contact portions 37ª below said blocks 36ª; each of the said strips 34ª being connected at 35ª to the body 32ª. In the operation of this modification, it will be noted that when a coin is deposited in the chute 50ª, it will rest with its lower edge on the fixed partition 39ª. Then when the lower arm of the lever and the chute with the coin therein are moved forwardly, the coin will first be moved forwardly to a position where it can drop in front of the stop 54ª. Then continued forward movement of the coin with the chute 50ª will be attended by depression of the long arm of the lever 25ª, which will bring up against the element 30ª and through the action of the latter against the body 32ª, will oppose the insulating blocks 36ª to the forward end of the lever 40ª. Continued forward movement of the coin in the chute 50ª, will also cause the coin to raise the arm of the lever 40ª and depress the forward arm of said lever when the spring strip will spring into engagement with said forward arm of the lever 40ª, and thereby complete the circuit corresponding to the particular coin at the point 37ª. When the coin drops through the opening 52ª, the spring 81ª will operate to return the lever 25ª to the position shown in Fig. 7, and then the enlargement 24ª on the rod 23ª will raise the element 30ª, which will release the conductive element 31ª and enable the same to gravitate to the position shown in Fig. 7, and thereby interrupt the circuit previously made at the point 37ª. At this point I would have it understood that the body 32ª of Fig. 7 may be and preferably is of insulating material, and that the construction shown in Fig. 7 is possessed of practically all of the advantages hereinbefore ascribed to the construction shown in Fig. 2.

In Fig. 8 I illustrate a modification in which an electro-magnet 29ᵉ is employed to return the latch 25ᵉ to normal position; said electro-magnet being energized when the circuit is completed at the points a and b, and being deënergized when the circuit is broken at the point a.

Figure 13:
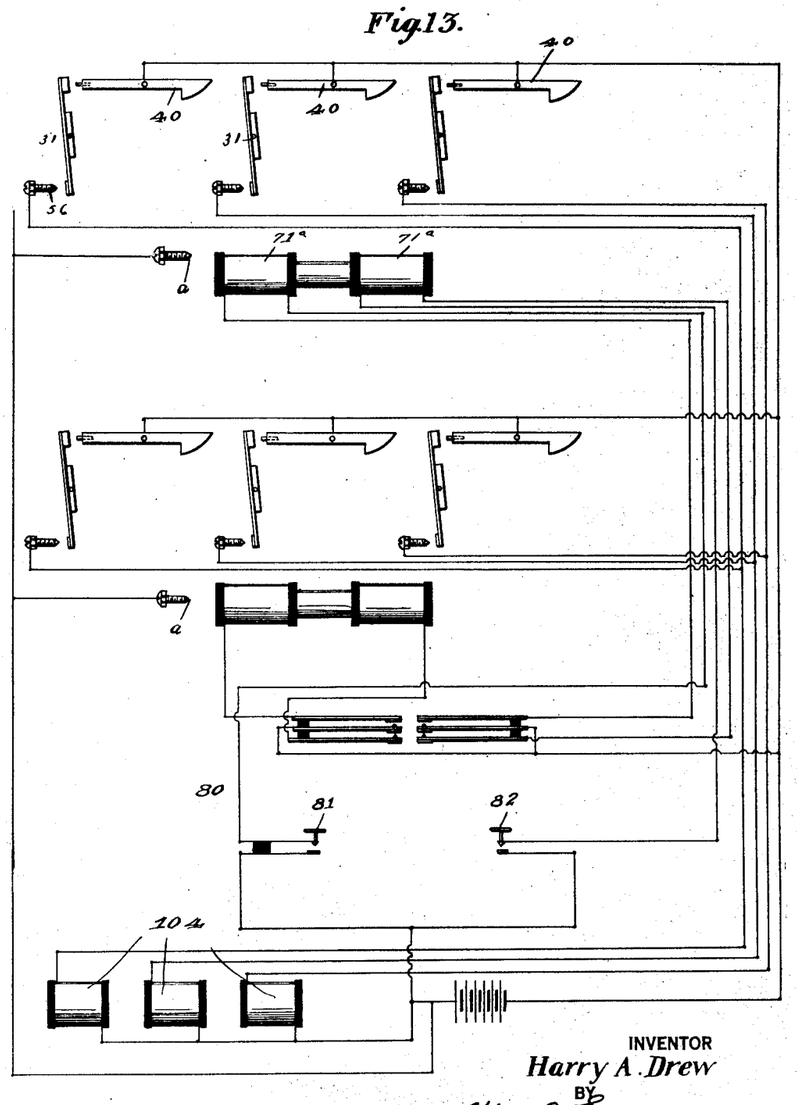
Fig. 13 is a diagrammatic view of the electrical connections complementary to two room units and the office or central station.

In Figs. 9 to 12 I illustrate the registering and control unit for use at a central station such, for instance, as the office of a hotel, and by comparison of the diagrammatic Fig. 13 with Figs. 9 to 12, and the other figures of the drawings, the general operation of my novel installation will be readily understood. It will be noted first that the unit 80 includes circuit closers 81 and 82, adapted when depressed to move the coin-receiving switch 60 for the discharge of the coin into the retention receptacle and return passage, respectively, Fig. 2. It will also be noted that there is a room circuit which must be completed between each room unit, Figs. 1 and 2, and the register and control unit 80. There are two of these room circuits defined in Fig. 13, and it will be understood that the circuit of a particular room must be completed by the depression of a button 83 numbered correspondingly to the room, Fig. 9, before the necessary electrical connection is established for coöperation between the room unit, Figs. 1 and 2, and the register and control unit 80. Therefore when the occupant of one of the rooms communicates with the office or central station, it is the province of the office attendant to depress the button 83 belonging to the particular room. Said depression of the button 83 will make ready the particular room circuit, and at the same time will in the well known manner (see Fig. 11) clear any previously established circuits. It is then the province of the attendant of the register and control unit 80, after observing the register, hereinafter described, to depress the button 81 or the button 82, as occasion demands, and thereby bring about either the placing of the money deposited in the room unit in the retention receptacle of said room unit, or to bring about the return of the money deposited to the occupant of the room.

Figures 3, 12:
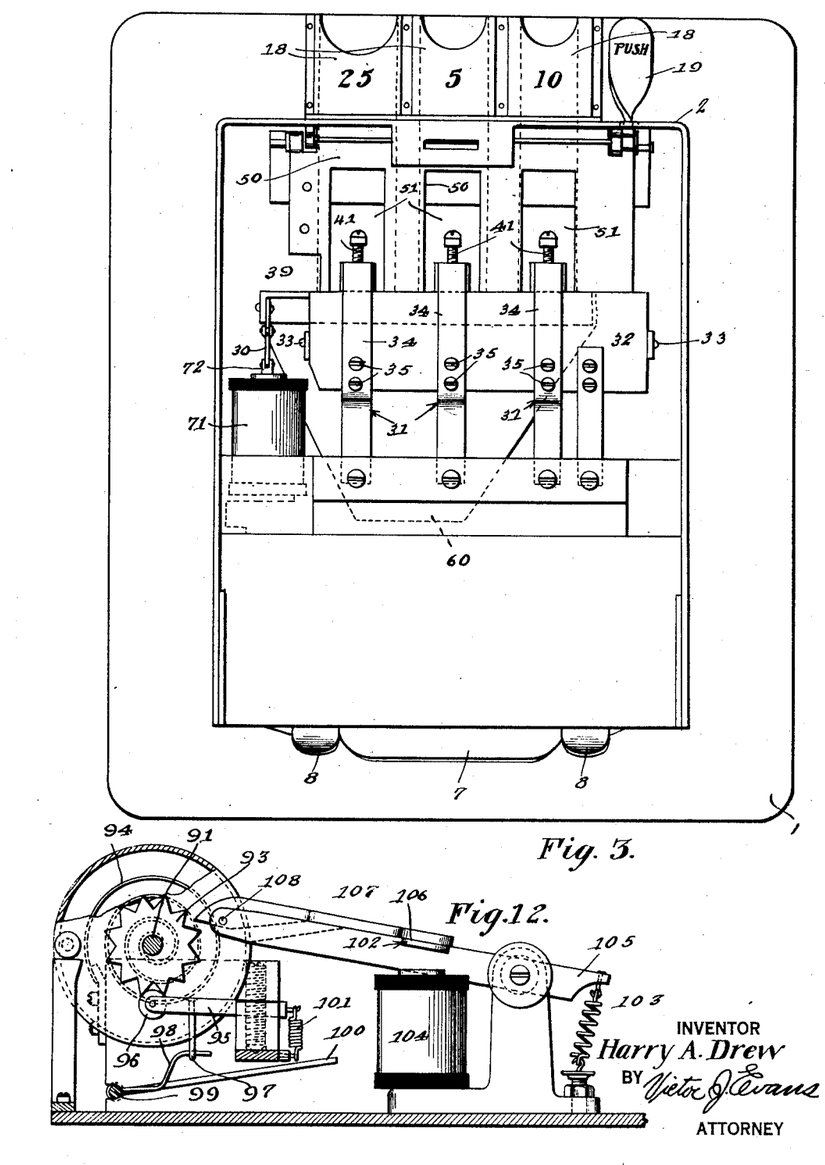
Fig. 3 is a front elevation of said unit with the cover section removed.
Fig. 12 is a longitudinal vertical section taken through a portion of said mechanism and showing the registering means and the resetting appurtenances complementary thereto.
Figure 10:
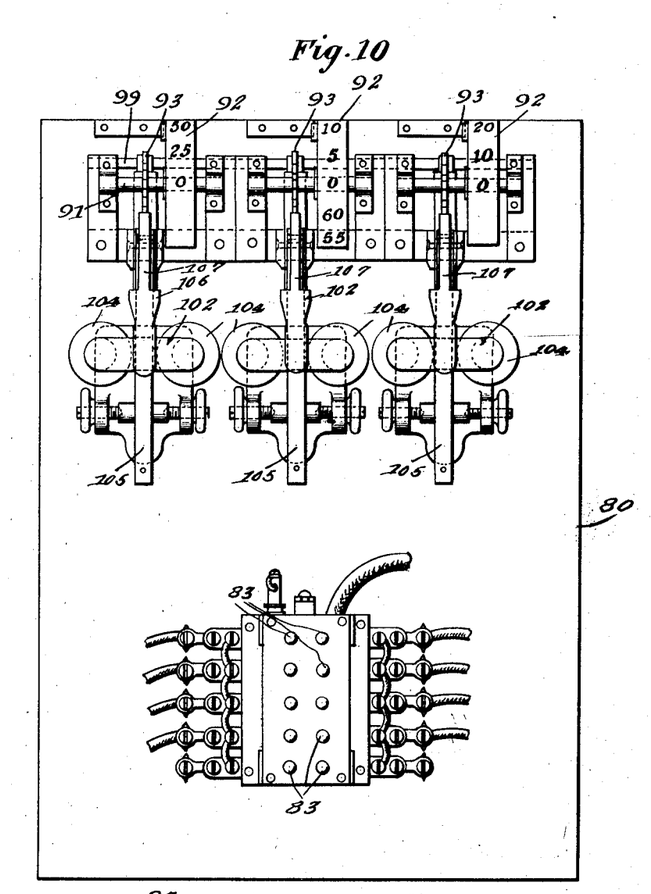
Fig. 10 is an enlarged plan view showing the interior mechanism thereof.
Figure 11:
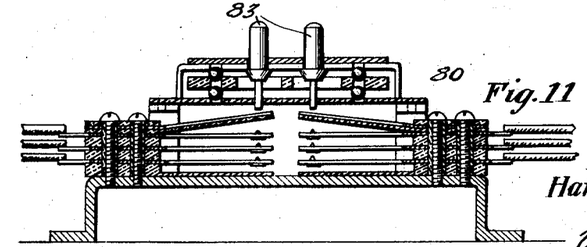
Fig. 11 is a transverse vertical section taken through a portion of said mechanism.

As the name imports, the register and control unit 80 also includes registering means, Figs. 10 and 12; said registering means being adapted to be reset after electrical operation thereof, by depression of the button 90, Fig. 9. Comparison of Figs. 10 and 12 will make clear the fact that the registering means of the present embodiment includes a transverse shaft 91, nickel, dime and quarter disks 92, loosely mounted on said shaft, and each fixed with respect to a star wheel 93, and each adapted to be returned to zero through the medium of a torsional spring 94, detents 95, having wheels 96 to stop the star wheels 93 on centers, arms 97 depending from the detents 95 and engaged by arms 98 on a rock-shaft 99 that also has an arm 100 disposed under the button 90, springs 101 connected to the detents 95, and compound armatures 102, one complementary to each star wheel 93 and subject to the action of a spring 103 and also subject to the action of electro-magnets 104. The said electro-magnets 104 are electrically connected, Fig. 13, with the coin-controlled circuit-completing means of the several room units. The compound armatures 102 constitute important features of my invention, as will be understood when it is stated that each compound armature includes a body portion 105, and a detent member 107, fulcrumed at 108 to the body 105, and arranged to engage and turn the complementary star wheel 93, and having lateral portions 106 in opposition to the poles of the complementary magnets 104. It will be manifest that when any pair of electro-magnets 104 are energized, the armature thereof will be attracted thereto and magnetized, so that for the time being the body 105 and the detent 107 will, in effect, be a single solid piece. This will assure positive and proper movement of the star wheel 93; and it is also advantageous since when the magnets are deënergized, the detent 107 is rendered free to move on the body 105, and this lends itself to easy disengagement of the detent from the star wheel. It will also be manifest that when the magnets 104 are deënergized, the detent 107 will be permitted to move relatively to the body 105, so that the star wheel will be easily and expeditiously released.

It will be apparent from the foregoing that when one of the disks 92 is turned to register the amount deposited in the particular room unit, the person in attendance on the unit 80 may readily reset the said disk 92 and its appurtenances, by depressing the button 90. It will also be apparent that in the diagram shown in Fig. 13, I have made provision for the modification illustrated in Fig. 8.

Having described my invention, what I claim and desire to secure by Letters-Patent, is:

1. In means for the purpose described, the combination of a partition having an opening for the downward passage of a coin, a coin stop back of said opening, a movable chute to move a coin to a position in front of said stop, chute-moving means, a circuit-closing element movable by said chute-moving means, and a circuit-closing lever for coöperation with said element to complete a circuit; said lever movable by the coin only after the coin reaches a position in front of said stop.

2. In means for the purpose described, the combination of a partition having an opening for the downward passage of a coin, a coin stop back of said opening, a movable chute to move a coin to a position in front of said stop, chute-moving means, a circuit-closing element movable by said chute-moving means, and a circuit-closing lever for coöperation with said element to complete a circuit; said lever movable by the coin only after the coin reaches a position in front of said stop, and said circuit-closing element having a resilient conductive strip and an insulating portion on said strip to engage the lever precedent to the engagement of the lever by said strip.

3. In means for the purpose described, the combination of a partition having an opening for the downward passage of a coin, a coin stop back of said opening, a movable chute to move a coin to a position in front of said stop, chute-moving means, a circuit-closing element movable by said chute-moving means, and a circuit-closing lever for coöperation with said element to complete a circuit; said lever movable by the coin only after the coin reaches a position in front of said stop, and said circuit-closing element having a body and a resilient conductive strip adapted to spring away from said body and an insulating portion on said strip to engage the lever precedent to the engagement of the lever by said strip.

4. In means for the purpose described, the combination of a partition having means for the downward passage of coins of different denominations, coin-stopping means back of said passage means, chutes movable as a unit to move coins to positions in front of said stop means, chute-moving means, a circuit closing element movable by said chute-moving means, and circuit closing levers for coöperation with said element to complete a plurality of circuits; each of said levers being movable by a coin only after the coin reaches a position in front of said stop means.

5. In means for the purpose described, the combination of a partition having means for the downward passage of coins of different denominations, coin-stopping means back of said passage means, chutes movable as a unit to move coins to positions in front of said stop means, chute-moving means, a circuit closing element movable by said chute-moving means, and circuit closing levers for coöperation with said element to complete a plurality of circuits; each of said levers being movable by a coin only after the coin reaches a position in front of said stop means, and said circuit-closing element having resilient conductive strips and insulating portions on said strips to engage the levers precedent to the engagement between said levers and said strips.

6. In means for the purpose described, the combination of a partition having means for the downward passage of coins of different denominations, coin-stopping means back of said passage means, chutes movable as a unit to move coins to positions in front of said stop means, chute-moving means, a circuit closing element movable by said chute-moving means, and circuit closing levers for coöperation with said element to complete a plurality of circuits; each of said levers being movable by a coin only after the coin reaches a position in front of said stop means, and said circuit-closing element having a body and resilient conductive strips adapted to spring away from said body and also having insulating portions on said strips to engage the levers precedent to the engagement of the levers by said strips.

7. In means for the purpose described, the combination of a casing, a lever, a plurality of coin chutes movable as a unit with the lever and having lateral openings, a swinging circuit-closing element, means operable by the lever to swing said element in one direction, a partition having an opening for the downward passage of coins and also having a hard plate on the partition back of said opening, said partition and plate extending through the lateral openings in the chutes, and headed circuit-closing levers, one complementary to each chute and operable by a coin after the same assumes a position in front of the stop to coöperate with the said circuit-closing element to close the circuit corresponding to the denomination of the coin.

8. In means for the purpose described, the combination of a plurality of manually movable coin chutes, means movable by coins in the chutes and having contact strips one complementary to each chute, movable circuit-closing members operable by coins in the chutes and arranged when so operated to make electrical connection with the said strips of the circuit-closing element, and stop means relatively arranged to rest back of a coin precedent to the action of the coin on its complementary circuit-closing member.

In testimony whereof I affix my signature.

HARRY A. DREW.